March 4, 1969 M. E. BAUM 3,431,319
FOAMED POLYSTYRENE ARTICLES COATED WITH AN UNSATURATED
POLYESTER RESIN HAVING MONOVINYL ETHER MONOMER
Filed Feb. 17, 1967

INVENTOR.
MELVIN E. BAUM
BY William J. Kratz, Jr.
his Agent

United States Patent Office 3,431,319
Patented Mar. 4, 1969

3,431,319
FOAMED POLYSTYRENE ARTICLES COATED WITH AN UNSATURATED POLYESTER RESIN HAVING MONOVINYL ETHER MONOMER
Melvin E. Baum, Monroeville, Pa., assignor to Koppers Company, Inc., a corporation of Delaware
Filed Feb. 17, 1967, Ser. No. 616,896
U.S. Cl. 260—861          9 Claims
Int. Cl. C09d *3/68;* C08f *21/02;* B32b *5/32*

ABSTRACT OF THE DISCLOSURE

Articles having a structure of foamed polystyrene are coated by a method which involves forming a layer on said article of a mixture of (1) an unsaturated polyester resin and (2) an ethylenically unsaturated polymerizable material selected from monovinyl ethers of the formula:

$$R-O-CH=CH_2$$

wherein R is an alkyl group having from 8–12 carbon atoms, a hydroxyalkyl group having from 4–12 carbon atoms or a hydroxypolyether group of the formula:

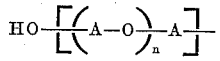

wherein A is an alkylene group having from 2–3 carbon atoms and $n$ is an integer from 1 to 15, and curing the coating without any substantial attack upon the polystyrene foam structure. The total mixture may be diluted with styrene to about 15–20% of the weight of the total mixture.

BACKGROUND OF THE INVENTION

Articles formed from expanded polystyrene have disadvantages in that polystyrene foam is very susceptible to attack by solvents and easily marred, scratched, or torn. The technical manual Dylite Expandable Polystyrene by Sinclair-Koppers Company, in Chapter 7, Bulletin C-9-273, dated November 1965, entitled, "Adhesives and Coatings Used With Foamed Dylite Polystyrene" on page 7 points out that the very attractive, inexpensive polyester coatings should, because of solvent action on foamed polystyrene, not be used except over a multibarrier precoat of shellac or other inert primers. The bulletin suggests various other coatings. Any attack on the polystyrene surface manifests itself by craters or roughness of the surfaces.

SUMMARY OF THE INVENTION

It has now been found that certain copolymerizable mixtures, the major ingredient of which is a polyester resin can be used for coating foamed polystyrene articles to impart desirable characteristics thereto, without significant attack on the surface of the article. These mixtures comprise unsaturated polyesters as the major ingredient and specific alkyl vinyl ethers, hydroxyalkyl vinyl ethers, or hydroxypolyether substituted vinyl ethers. If desired, the mixture may be diluted with styrene which is an inexpensive monomer. Heretofore, styrene has not been used because it attacks polystyrene foam. In accordance with this invention, the mixture may be diluted with styrene up to 15–20% of the total copolymerizable mixture, if catalysts are added to speed up the cure of the mixtures.

The foamed polystyrene articles have applied thereto a layer of this copolymerizable mixture and the mixture is cured.

DETAILED DESCRIPTION

Figure 1:
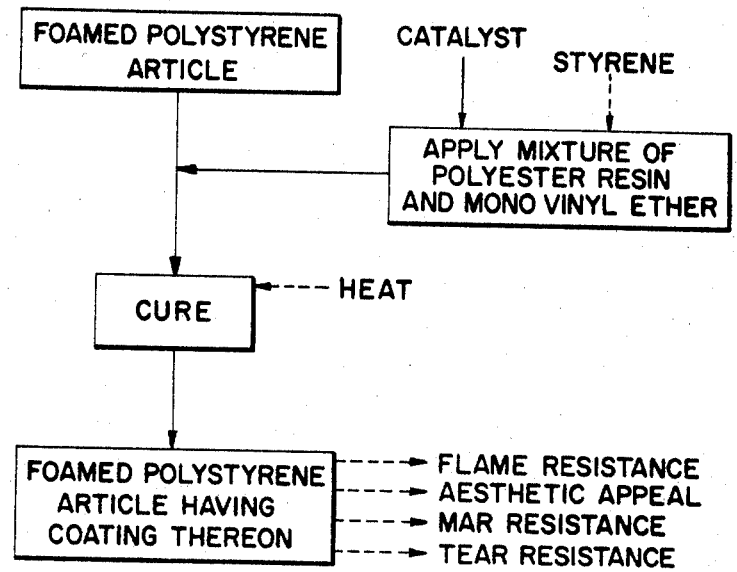
FIGURE 1 is a flow diagram schematically illustrating the process of the present invention. The foamed polystyrene article has applied thereto a coating of a mixture of polyester resin and the specified monovinyl ether and alternatively styrene and a suitable curing catalyst. The coating on the polystyrene article is then cured by various known methods to provide a coated foamed polystyrene article having various desirable characteristics.
Figure 2:
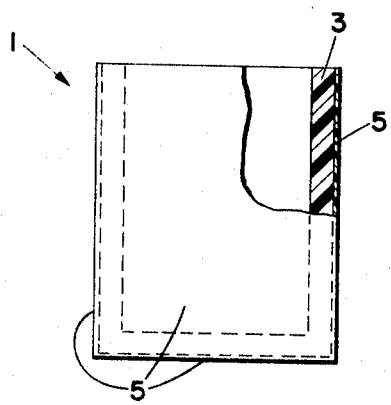
In FIGURE 2, there is illustrated a foamed polystyrene container 1, having applied thereto the coating 5, of the present invention. The container has a partial cutaway to expose the foamed polystyrene 3, and illustrate the coating 5, of the invention on the exterior surface of the container showing that no significant craters or irregularities are produced in the foamed polystyrene surface when using the coating method of the present invention.

The major proportion of the coating composition is an unsaturated polyester resin and is may constitute from 51–80% by weight of the total composition. The unsaturated polyester to be used in the copolymerizable mixture can be any of the readily available commercial polyesters. Such unsaturated polyesters are well known in the art. A particularly desirable group of polyesters is sold under the trademark Koplac, provided that styrene be present only in amounts so as to fall within the hereindescribed limits. The polyesters are generally formed by the esterification reaction of a carboxylic acid or anhydride with polyhydric alcohols, at least one of these reactants having $\alpha,\beta$-ethylenic unsaturation. The esterification products so produced contain ethylenic unsaturation in the essentially linear chains. Such unsaturation is suitable for subsequent reaction.

The specific polyester resin to be used in each instance depends upon the properties which are desired in the coating for the foamed polystyrene article. For example, if flame resistance is desired, halogenated unsaturated polyesters or other polyesters known to resist flame are used. Also, chemical resistant and corrosion resistant polyesters are useable.

The minor proportion of the coating composition is a monovinyl ether of the formula:

$$R-O-CH=CH_2$$

wherein R is an alkyl group having from 8–12 carbon atoms, a hydroxyalkyl group having from 4–12 carbon atoms or a hydroxypolyether group of the formula:

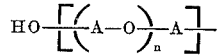

wherein A is an alkylene group having from 2–3 carbon atoms and $n$ is an integer from 1 to 15.

Typical alkyl vinyl ethers which may be used are: 2-ethylhexyl vinyl ether, decyl vinyl ether, and the like. Alkyl vinyl ethers having less than 8 carbon atoms in the alkyl chain, such as tertiary butyl vinyl ether and isobutyl vinyl ether are not suitable for use in the copolymerizable mixture because such ethers cause pocking or irregularities in the surface of the foamed polystyrene article.

Typical hydroxyalkyl vinyl ethers are hydroxybutyl ether, hydroxyhexyl vinyl ether, hydroxydecyl vinyl ether and the like.

Also useful in my process are the hydroxypolyether substituted vinyl ethers, the hydroxypolyether group having the formula:

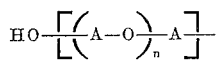

wherein A is an alkylene group having 2–3 carbon atoms and $n$ is an integer from 1 to 15. Useful, for example, are diethylene glycol monovinyl ether and the higher molecular weight derivatives thereof. The foregoing minor constituents of the mixture are monovinyl ethers. The divinyl ethers are not suitable for use in the process because these attack the foamed polystyrene. For example, diethylene glycol divinyl ether causes severe attack on the polystyrene article.

The copolymerizable mixture preferably contains about 20–49 parts by weight of the monovinyl ether per 100 parts of the total copolymerizable mixture, with the remainder being the unsaturated polyester.

Styrene can be substituted for a portion of the ethylenically unsaturated polymerizable material. When a catalyst is used for the curing of the coplymerizable mixture, styrene may be substituted to the extent of 15–20% of the total weight of the copolymerizable mixture. In place of styrene, obvious analogous monomers such as vinyltoluene may be used.

The amount of time necessary for the copolymerization of the unsaturated polyester resin and the ethylenically unsaturated polymerizable material is, of course, pertinent to commercial practices. Depending upon the mixture, heat curing with infra-red lamp or the like which accelerates a catalyzed curing may be suitable.

Catalysts to increase the rate of copolymerization of the unsaturated polyester resin and the ethylenically unsaturated polymerizable material are advantageously used. Such catalysts are used in an amount of about 0.5 to 2.5% by weight of the copolymerizable mixture.

Illustrative of catalysts which may be used are the various organic peroxides and hydroperoxides well known in the art. Examples of the organic peroxides are benzoyl peroxide, substituted benzoyl peroxides, acetyl peroxide, cyclohexanone peroxide, dicumyl peroxide, methyl ethyl ketone peroxide, and the like. These may be used in conjunction with promoters such as tertiary amines, metal esters and the like. For example, a mixture of methyl ethyl ketone with cobalt naphthanate, octanoate or linoleate may be used, or to this mixture there may be added a second promoter such as dimethylaniline or diethylaniline. Also a mixture of benzoyl peroxide and a dialkylaniline may be used, as may a mixture of cyclohexanone peroxide and maganese naphthanate. In addition, other catalysts such as organic hydroperoxides, for example, cumene hydroperoxide and t-butyl hydroperoxide in conjunction with organic mercaptans or other promoters are useful, as are other polymerization catalysts such as Friedel-Crafts catalysts, for example, aluminum chloride and stannic chloride, and the boron trifluoride and trialkyl boron catalysts. The amount and specific catalyst to be used for each system is readily ascertained by one skilled in the art.

Up to about 15–20% by weight of the copolymerizable mixture can comprise styrene, with the polyester resin and ethylenically unsaturated polymerizable material making up the remainder of the mixture. The type and amount of catalyst best suited for specific polyester resins is readily determined from the art.

The copolymerizable mixture can also contain conventional inhibitors, ultraviolet light absorbers, and pigments or dyes. Filler such as glass fibers, ground glass, clays, alumina, calcium carbonate, talc, and silica can also be used.

To form the copolymerizable mixture for use in the process of the invention, the unsaturated polyester and the monovinyl ether, or, if desired, a mixture of the abovedescribed monovinyl ethers, with styrene added if preferred, are mixed together to form a liquid coating composition. This liquid coating composition can then be applied to the polystyrene article. Before the application, the suitable catalysts may be added to the mixture and the mixture then used for coating the polystyrene article, or some catalyst components can be sprayed on the polystyrene foam article surface before the application of the polyester resin mixture. Systems are well known in the art to bring together the catalyst(s) and resin mixture at the appropriate time.

The coating of copolymerizable mixture is applied by any known process, such as by spraying, brushing, dipping and the like. The amount of copolymerizable mixture applied to the surface by such methods depends on the specific properties desired in the finished article. Thick or thin coats of polyester resin can be added at will by various known convenient methods. Normally, the coatings will vary from 1 to 30 mils in thickness.

My invention is further illustrated by the following examples.

Example I

To 70 parts by weight of a polyester resin, prepared from 1 mole part of maleic anhydride, 1 mole part of phthalic anhydride, and 2.2 mole parts of propylene glycol, there was added 10 parts by weight of diethyleneglycol monovinyl ether and 20 parts by weight of styrene. After thoroughly mixing, the copolymerizable mixture with catalyst added thereto, was brushed on a polystyrene foam ice bucket, the bucket having a density of about 2 pounds per cubic foot. The clear, syrupy copolymerizable mixture was brushed on the article to a thickness of 2–4 mils. The coated ice bucket was allowed to stand at room temperature and after 24 hours had passed, a hard, glossy, smooth, cured coating resulted. The polystyrene foam ice bucket was mar and tear resistant.

Example II

A series of compositions were formed in which the polyester resin content was kept constant at 70% by weight and the ethylenically unsaturated polymerizable material was kept constant at 30% by weight. The ethylenically unsaturated material constituted two components and the ratios of the two components were varied. Thus, the one component hydroxybutyl vinyl ether was varied from 0–30% by weight and the other component styrene was by difference varied from 30–0% by weight. The polyester used was a commercially available resin prepared from a ratio of 1 mole part of maleic anhydride, 1 mole part of phthalic anhydride and 2.2 mole parts of propylene glycol. Each of the compositions containing varying ratios of styrene and hydroxybutyl vinyl ether were then separated into two portions, one portion to have a catalyst added thereto and the other portion without any added catalyst. The catalyzed compositions contained 1.5% by weight of catalyst. The catalyst used was 1% methyl ethyl ketone peroxide (as a 60% solution in dimethylphthalate) and 0.5% cobalt naphthanate (as a 6% cobalt content solution in mineral spirits). Five drops of each individual composition was dropped together on blocks of foamed polystyrene having a density of 1 pound per cubic foot. The resins were then observed, the time of attack and the severity of the attack on the surface of the blocks noted. The uncatalyzed systems were carefully observed to determine how long the polystyrene foam surface withstood attack. The results obtained are listed in Table I.

TABLE I

| Sample | Percent polyester | Percent styrene | Percent hydroxybutyl vinyl ether | Catalyst, percent | Severity of attack time, hours | | | | Cavity formed after 48 hours (in.) | |
|---|---|---|---|---|---|---|---|---|---|---|
| | | | | | 1/12 | 0.5 | 2 | 24 | Depth | Width |
| A | 70 | 30 | 0 | 0 | S | | | | 3/8 | 1/4 |
| | | | | 1.5 | S | | | | 3/8 | 1/4 |
| B | 70 | 25 | 5 | 0 | S | | | | 3/8 | 1/2 |
| | | | | 1.5 | S | | | | 3/8 | 1/2 |
| C | 70 | 20 | 10 | 0 | S | | | | 3/8 | 1/2 |
| | | | | 1.5 | Sl | S | | | 3/8 | 1/2 |
| D | 70 | 15 | 15 | 0 | Sl | Sl | S | | 1/4 | 1/4 |
| | | | | 1.5 | N | N | N | N | None | None |
| E | 70 | 10 | 25 | 0 | Sl | Sl | Sl | S | 3/8 | 1/2 |
| | | | | 1.5 | N | N | N | N | None | None |
| F | 70 | 5 | 25 | 0 | N | N | N | N | None | None |
| | | | | 1.5 | N | N | N | N | None | None |
| G | 70 | 0 | 30 | 0 | N | N | N | N | None | None |
| | | | | 1.5 | N | N | N | N | None | None |

S=Severe. Sl=Slight. N=No noticeable attack.

Example III

The procedure fo Example II was repeated except that diethyleneglycol monovinyl ether was substituted for the hydroxybutyl vinyl ether in the compositions. The results obtained are listed in Table II.

TABLE II

| Sample | Percent polyester | Percent styrene | Percent diethyleneglycol monovinyl ether | Catalyst percent | Severity of attack time, hour | | | | Cavity formed after 48 hours (in.) | |
|---|---|---|---|---|---|---|---|---|---|---|
| | | | | | 1/12 | 0.5 | 2 | 24 | Depth | Width |
| H | 70 | 30 | 0 | 0 | S | | | | 3/8 | 1/4 |
| | | | | 1.5 | Sl | S | | | 3/8 | 1/4 |
| I | 70 | 25 | 5 | 0 | S | | | | 3/8 | 1/4 |
| | | | | 1.5 | Sl | S | | | 3/8 | 1/4 |
| J | 70 | 20 | 10 | 0 | Sl | S | | | 3/8 | 3/8 |
| | | | | 1.5 | N | N | N | N | None | None |
| K | 70 | 15 | 15 | 0 | Sl | Sl | S | | 3/16 | 3/8 |
| | | | | 1.5 | N | N | N | N | None | None |
| L | 70 | 10 | 20 | 0 | N | N | N | N | None | None |
| | | | | 1.5 | N | N | N | N | None | None |
| M | 70 | 5 | 25 | 0 | N | N | N | N | None | None |
| | | | | 1.5 | N | N | N | N | None | None |
| N | 70 | 0 | 30 | 0 | N | N | N | N | None | None |
| | | | | 1.5 | N | N | N | N | None | None |

S=Severe. Sl=Slight. N=No noticeable attack.

Example IV

Seventy parts of a general purpose polyester resin, sold under the trademark Koplac Resin 2000 (no styrene present) were mixed with 15 parts of 2-ethylhexyl vinyl ether and 15 parts styrene. The clear viscous resultant solution was brushed on a block of foamed polystyrene to form a layer approximately 2 mils in thickness and the copolymerizable mixture cured at room temperature. After 24 hours had passed, the foamed polystyrene had a hard, glossy coating. The foamed polystyrene was not attacked by the copolymerizable mixture during the cure of the coating.

Example V

A polystyrene block having a density of about 1.5 pounds per cubic foot was coated with a copolymerizable mixture containing 70 parts by weight of a halogenated polyester resin, similar to that sold under the trademark Koplac 3400 (no styrene present in the resin mixture) 20 parts by weight of hydroxybutyl vinyl ether and 10 parts by weight of styrene. A coating of approximately 4–5 mils was applied to the polystyrene block and the catalyzed coating cured at room temperature. After the coating had cured, the polystyrene block was resistant to flame whereas a polystyrene block which was uncoated was quickly consumed when contacted with a flame.

Example VI

Three compositions were formed using 70 parts by weight of a general purpose polyester resin and 30 parts by weight of one of the following: tertiary butyl vinyl ether, isobutyl vinyl ether, and diethyleneglycol divinyl ether. Each of the three coatings were used to coat polystyrene blocks having a density of about 2 pounds per cubic foot. All three of the coating compositions caused rapid and severe attack upon the surface of the polystyrene foam and created craters and irregularities in the surface.

There is thus provided a method and a composition for use in coating polystyrene articles. Foamed polystyrene is an important and extensively used material. The foamed polystyrene may have densities ranging from 0.8 to 20 pounds per cubic foot. The foamed polystyrene is made up of individual expandable beads which upon molding fuse to form a lightweight expanded polystyrene article. Since the foamed polystyrene consists of individual cells, each cell having thin walls, any attack upon the foam polystyrene articles causes extensive damage to the surface of the article. In accordance with this invention, foamed polystyrene articles having sharply defined surfaces can be coated with a composition containing a major portion of a polyester resin without effecting the sharply defined details of the article. Coatings may be provided which are glossy, and have aesthetic appeal, or the article can be rendered flame and mar resistant, or chemically resistant and solvent resistant.

I claim:

1. Method of coating a foam polystyrene article comprising applying to said foam polystyrene article a layer of a copolymerizable mixture comprising from 51–80% by weight of the total mixture of an unsaturated polyester resin and 20–49% by difference of a monovinyl ether having the formula:

wherein R is selected from the group consisting of an alkyl group having 8–12 carbon atoms, a hydroxyalkyl group having 4–12 carbon atoms, and a hydroxypolyether group of the formula:

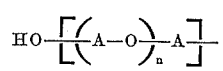

wherein A is an alkylene group having 2–3 carbon atoms and $n$ is an integer from 1 to 15 and curing the copolymerizable mixture.

2. A polystyrene foam article coated according to claim 1.

3. Method of providing a coating on foam polystyrene articles comprising:
(a) coating said foam polystyrene article with a copolymerizable mixture comprising (A) 51–80 percent by weight of an unsaturated polyester resin and (B) 49–20 percent by weight of a monovinyl ether having the formula:

$$R\text{---}O\text{---}CH=CH_2$$

wherein R is selected from the group consisting of an alkyl group having 8–12 carbon atoms, a hydroxyalkyl group having from 4–12 carbon atoms and a hydroxypolyether group of the formula:

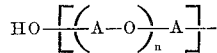

wherein A is an alkylene group having 2–3 carbon atoms and $n$ is an integer from 1 to 15, said vinyl ether containing styrene in an amount of 0–20 percent by weight of said copolymerizable mixture; and
(b) curing said copolymerizable mixture with from 0–2.5 percent by weight of said copolymerizable mixture of a curing catalyst to form a coating on said polystyrene article.

4. A polystyrene article coated according to the method of claim 3.

5. The method of claim 3 wherein vinyltoluene is substituted for said styrene.

6. A copolymerizable coating composition for coating polystyrene foam comprising (A) 51–80 parts by weight of an unsaturated polyester resin, (B) 20–49 parts by weight of a monovinyl ether of the formula:

$$R\text{---}O\text{---}CH=CH_2$$

wherein R is selected from the group consisting of an alkyl group having 8–12 carbon atoms, a hydroxyalkyl group having from 4–12 carbon atoms, and a hydroxypolyether group of the formula:

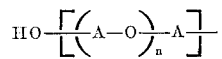

wherein A is an alkylene group having 2–3 carbon atoms and $n$ is an integer from 1 to 15; said monovinyl ether containing from 0–20 parts by weight of said total copolymerizable coating composition of styrene, and (C) 0–2.5 parts by weight of said total copolymerizable coating composition of a curing catalyst.

7. The composition of claim 6 wherein said monovinyl ether is 2-ethylhexyl vinyl ether.

8. The composition of claim 6 wherein said monovinyl ether is hydroxybutyl vinyl ether.

9. The composition of claim 6 wherein said monovinyl ether is diethyleneglycol monovinyl ether.

References Cited

UNITED STATES PATENTS

| 3,207,648 | 9/1965 | Collardeau et al. | 117—138.8 |
| 3,026,286 | 3/1962 | Parker | 260—872 |

MURRAY TILLMAN, *Primary Examiner.*

J. T. GOOLKASIAN, *Assistant Examiner.*

U.S. Cl. X.R.

117—138.8, 161; 260—2.5